(12) United States Patent
Yoshikawa et al.

(10) Patent No.: US 11,636,838 B2
(45) Date of Patent: Apr. 25, 2023

(54) SOUNDPROOF MEMBER

(71) Applicant: Sumitomo Riko Company Limited, Aichi (JP)

(72) Inventors: Kei Yoshikawa, Aichi (JP); Koji Tomiyama, Aichi (JP); Akio Yabu, Aichi (JP); Yasuo Suzuki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 504 days.

(21) Appl. No.: 16/783,174

(22) Filed: Feb. 6, 2020

(65) Prior Publication Data

US 2020/0175953 A1  Jun. 4, 2020

Related U.S. Application Data (63) Continuation of application No. PCT/JP2018/037224, filed on Oct. 4, 2018.

(30) Foreign Application Priority Data

Oct. 4, 2017  (JP) .............................. JP2017-194581

(51) Int. Cl.
*G10K 11/168* (2006.01)
*B60R 13/08* (2006.01)
(Continued)

(52) U.S. Cl.
CPC ............ *G10K 11/168* (2013.01); *B60R 13/08* (2013.01); *C08J 9/0066* (2013.01); *C08K 3/04* (2013.01);
(Continued)

(58) Field of Classification Search
None
See application file for complete search history.

(56) References Cited

U.S. PATENT DOCUMENTS

| | | | |
|---|---|---|---|
| 2009/0113843 A1 | 5/2009 | Levit et al. | |
| 2015/0197933 A1 | 7/2015 | Tomiyama et al. | |
| 2019/0362700 A1* | 11/2019 | Yamazoe | E04B 1/8404 |

FOREIGN PATENT DOCUMENTS

| | | |
|---|---|---|
| DE | 10305812 | 9/2004 |
| JP | H0671938 | 10/1994 |

(Continued)

OTHER PUBLICATIONS

Office Action of Japan Counterpart Application, with English translation thereof, dated Sep. 21, 2021, pp. 1-8.

(Continued)

*Primary Examiner* — Joseph D Anthony
(74) *Attorney, Agent, or Firm* — JCIPRNET (57) ABSTRACT

A soundproof member is mounted on a structure including a rotation body, covers at least a part of outer peripheral surfaces of the structure, includes an integral article of an elastic member, and has eccentrically located portions having at least a greater thickness or a greater density than the other portions. The eccentrically located portions may be thick wall portions having a greater thickness than the other portions. When the elastic member has a base material including polymer and a magnetic filler included in a state of being oriented in the base material, highly filled portions in which a content of the magnetic filler is greater than that of the other portions can be set as the eccentrically located portions.

13 Claims, 7 Drawing Sheets

(51) Int. Cl.
  *G10K 11/172*  (2006.01)
  *C08K 3/04*    (2006.01)
  *C08J 9/00*    (2006.01)

(52) U.S. Cl.
  CPC ......... *G10K 11/172* (2013.01); *C08J 2375/04* (2013.01); *C08K 2201/01* (2013.01)

(56) References Cited

FOREIGN PATENT DOCUMENTS

| | | |
|---|---|---|
| JP | H06100245 | 12/1994 |
| JP | H09230873 | 9/1997 |
| JP | 2006023423 | 1/2006 |
| JP | 2009235979 | 10/2009 |
| JP | 2015069012 | 4/2015 |

OTHER PUBLICATIONS

"Office Action of Germany Counterpart Application", dated Nov. 26, 2020, with English translation thereof, p. 1-p. 9.
"International Search Report (Form PCT/ISA/210) of PCT/JP2018/037224," dated Jan. 8, 2019, with English translation thereof, pp. 1-2.
"Written Opinion of the International Searching Authority (Form PCT/ISA/237)" of PCT/JP2018/037224, dated Jan. 8, 2019, with English translation thereof, pp. 1-10.
"Office Action of China Counterpart Application", dated Feb. 12, 2023, with English translation thereof, p. 1-p. 16.

* cited by examiner

SOUNDPROOF MEMBER

CROSS-REFERENCE TO RELATED APPLICATION

The present application is a continuation of PCT/JP2018/037224, filed on Oct. 4, 2018, and is related to and claims priority from Japanese patent application no. 2017-194581, filed on Oct. 4, 2017. The entire contents of the aforementioned application are hereby incorporated by reference herein.

BACKGROUND OF THE DISCLOSURE

Technical Field

The present disclosure relates to a soundproof member mounted on a drive device or a power transmission device.

Related Art

In a vehicle, it is required to reduce noise generated from a drive device such as an engine, a motor or the like, or a power transmission device such as a transmission or the like. In addition, a requirement for silence improvement in a vehicle interior is also increased. For example, drive noise, which is generated from a motor unit for a power seat or the like, is also a subject to be reduced. As a noise countermeasure, for example, a sound absorption material or a vibration absorbing material which is made of a foam such as polyurethane foam or the like is used. However, the foam has a small thermal conductivity because a large number of cells (bubbles) is inside the foam. Therefore, when the foam is arranged surrounding the engine, the motor or the like which generates heat, there is a risk that the heat is accumulated and troubles are caused. Thus, when the foam is used as the sound absorption material, it is necessary to improve heat dissipation of the foam. In this point, in patent literature 1, a sound absorption cover made of a foam including a magnetic filler is disclosed. In the sound absorption cover described in patent literature 1, the magnetic filler having a high thermal conductivity is oriented in a thickness direction of the sound absorption cover. Therefore, not only can the noise be reduced, but the heat generated in the noise source can also be quickly released via the oriented magnetic filler.

If a device including a rotation body such as a motor, a gear or the like is activated, high frequency air propagation sound or low frequency solid propagation sound is generated. The solid propagation sound includes the sound caused by torsional vibration (vibration in a rotation direction) unique to the rotation body. In addition, when a rotation direction or a rotation speed of the motor is changed, frequency of the noise is changed. The sound absorption cover described in the patent literature 1 (Japanese Patent Application Laid-Open No. 2015-069012) using the foam is effective in reducing high frequency noise from the motor. However, a reduction effect on low frequency noise of 1000 Hz or lower caused by the solid propagation sound is small.

On the other hand, a dynamic damper is known as a device for reducing vibration (see the patent literature 2: Japanese Patent Application Laid-Open No. 6-100245, and patent literature 3 Japanese Utility Model Laid-Open: No. 6-71938). Generally, the dynamic damper is configured in a manner that a mass is elastically supported via an elastic body such as rubber or the like with respect to a vibration body which is an object to be damped. When the vibration body is vibrated with a specific frequency, the mass and the elastic body form a vibration system including a mass spring to resonate so as to absorb and reduce the vibration of the vibration body. However, the conventional dynamic damper requires two different members which are the elastic body and the mass, and should be attached in the vibration direction of the vibrating body. In addition, the conventional dynamic damper is effective in reducing the low frequency noise, but cannot reduce the high frequency noise. In addition, when a frequency band to be reduced is narrow, and the rotation direction or the rotation speed of the motor is changed or the like, a sufficient noise reduction effect cannot be obtained for an object whose frequency changes.

SUMMARY

As described above, a soundproof member is provided, which can suppress, when the soundproof member is mounted on a structure including a rotation body, solid propagation sound caused by torsional vibration and reduce noise with a wide frequency band ranging from a high frequency to a low frequency.

The soundproof member of the present disclosure is mounted on a structure including a rotation body, covers at least a part of outer peripheral surfaces of the structure, includes an integral article of an elastic member, and has eccentrically located portions having at least a greater thickness or a greater density than the other portions.

The soundproof member of the present disclosure includes the integral article of an elastic member and has the eccentrically located portions. The eccentrically located portions have at least a greater thickness or a greater density than the other portions. That is, the eccentrically located portions are thick parts, high-density parts, or both, and thus a weight of the eccentrically located portions is larger than weights of other portions. Therefore, the soundproof member of the present disclosure is the integral article of an elastic member and the eccentrically located portions function as weights, and thereby an anti-vibration effect by the so-called mass-spring is played. Thereby, according to the soundproof member of the present disclosure, an anti-vibration function by the mass-spring is added to a sound absorption and sound insulation function by the elastic member, and thereby both a reduction in radiation sound propagating through air and a reduction in solid propagation sound can be achieved. That is, according to the soundproof member of the present disclosure, not only high-frequency noise such as the radiation sound or the like, but also low-frequency noise of 1000 Hz or lower propagating through solid can be reduced.

According to the soundproof member of the present disclosure, by changing a spring constant of the elastic member, or by changing a configuration, a shape, positions, the number or the like of the eccentrically located portions, a resonance frequency of the soundproof member can be changed. By adjusting the resonance frequency of the soundproof member, the solid propagation sound caused by the torsional vibration unique to the rotation body can also be suppressed. In addition, in order to change the configuration of the eccentrically located portions, it is only necessary to mold the elastic member, assembling of other members is not required. Thus, according to the soundproof member of the present disclosure, tuning corresponding to the vibration frequency to be reduced is easy.

DESCRIPTION OF THE EMBODIMENTS

Embodiments of a soundproof member of the present disclosure are described below.

First Embodiment

[Configuration]

Figure 1:
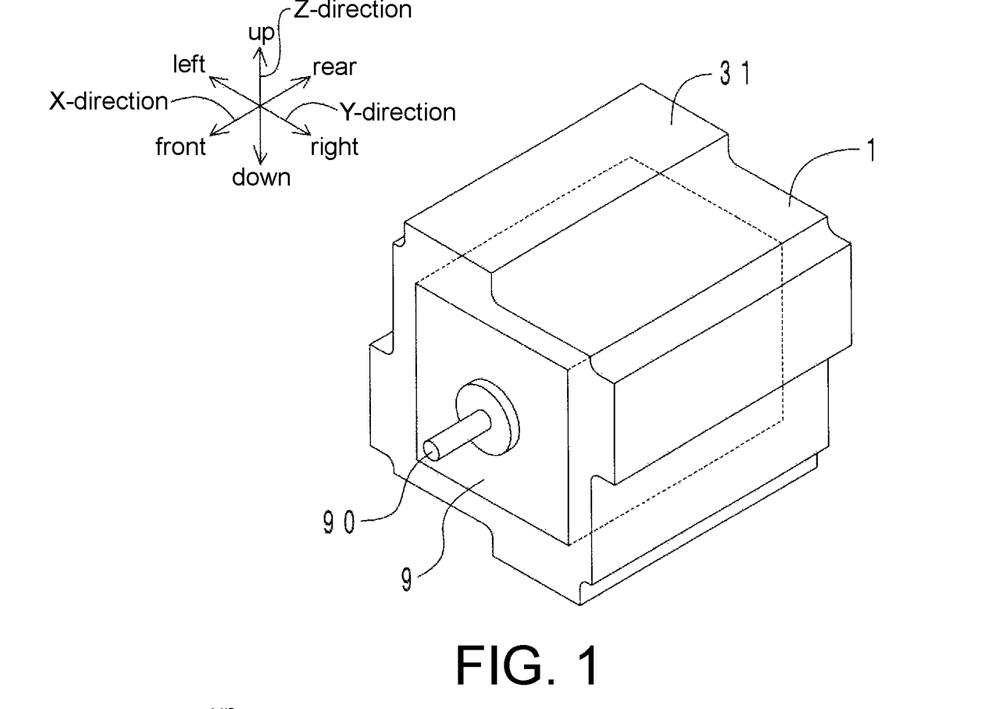
FIG. 1 is a perspective view of a soundproof member of the first embodiment in a state of being mounted on a motor.
Figure 2:
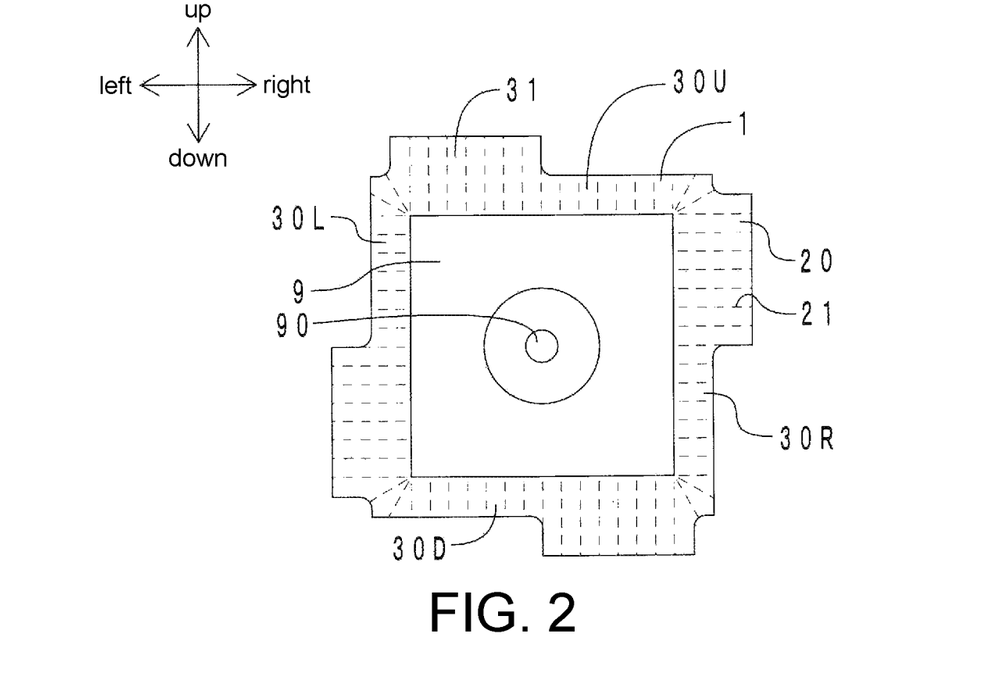
FIG. 2 is a front view of the soundproof member and schematically shows an oriented state of composite particles included in the soundproof member.

First, a configuration of a soundproof member of the embodiment is described. FIG. 1 is a perspective view of the soundproof member of the embodiment in a state of being mounted on a motor. FIG. 2 is a front view of the soundproof member. FIG. 2 schematically shows an oriented state of composite particles included in the soundproof member. In FIG. 1 and FIG. 2, a rotation shaft direction (a front-rear direction) of the motor is defined as an X-direction, and in two directions orthogonal to the X-direction, a horizontal direction (a left-right direction) is defined as a Y-direction, and a vertical direction (an up-down direction) is defined as a Z-direction. A rotation direction of a rotation shaft of the motor is defined as a circumferential direction.

As shown in FIG. 1 and FIG. 2, the soundproof member 1 has a rectangular parallelepiped box shape having an opening on one end surface (a front surface). The soundproof member 1 covers an entire circumferential surface (four side surfaces, namely, an upper surface, a lower surface, a left surface, and a right surface) and a rear surface of outer peripheral surfaces of the motor 9. The motor 9 is accommodated inside the soundproof member 1. The motor 9 has a rotation shaft 90. The motor 9 is included in a concept of "a structure including a rotation body" in the present disclosure.

The soundproof member 1 is an integral article of an elastic member which includes composite particles 21 and is made of a polyurethane foam. That is, the soundproof member 1 has a base material 20 including polyurethane foam and the composite particles 21. The composite particles 21 are particles which are obtained by combining graphite particles and stainless steel particles. As schematically shown in FIG. 2, the composite particles 21 are continuously oriented in a thickness direction of the soundproof member 1. The composite particles 21 are included in a concept of a magnetic filler of the present disclosure.

The soundproof member 1 has, corresponding to the four side surfaces of the motor 9, four side wall portions including an upper wall portion 30U, a lower wall portion 30D, a left wall portion 30L, and a right wall portion 30R. In each of the four side wall portions, thick wall portions 31 which has a thickness greater than the thickness of the other portions of the side wall portions are arranged. In the four side wall portions, the other portions except the thick wall portions 31 have the same thickness.

Each of the four thick wall portions 31 has a rectangular parallelepiped shape and extends in the X-direction. The thick wall portions 31 are arranged on one side of the side wall portions. That is, the thick wall portion 31 of the upper wall portion 30U is arranged in a left half region of the upper wall portion 30U. The thick wall portion 31 of the right wall portion 30R is arranged in an upper half region of the right wall portion 30R. The thick wall portion 31 of the lower wall portion 30D is arranged in a right half region of the lower wall portion 30D. The thick wall portion 31 of the left wall portion 30L is arranged in a lower half region of the left wall portion 30L. The four thick wall portions 31 are arranged separately in the circumferential direction at regular intervals. A resonance frequency in the circumferential direction of the soundproof member 1 is designed to be coincident with a rotation first-order component of the motor 9.

[Operation and Effect]

Next, operation and effect of the soundproof member of the embodiment are described. The soundproof member 1 includes an integral article of the elastic member having the base material 20 including polyurethane foam and the oriented composite particles 21. The composite particles 21 include the graphite particles and the stainless steel particles having a high thermal conductivity, and are continuously oriented in the thickness direction of the soundproof member 1, that is, the vertical direction with respect to the outer peripheral surfaces of the motor 9. In this manner, radiation sound from the motor 9 is absorbed and shielded, and heat generated by the motor 9 is quickly released.

The soundproof member 1 has the thick wall portions 31. The mass of the thick wall portions 31 is greater than the mass of the other portions. Accordingly, the soundproof member 1 is the integral article of the elastic member and the thick wall portions 31 function as weights, and thereby an anti-vibration effect by the so-called mass spring is played. Thus, according to the soundproof member 1, an anti-vibration function by the mass spring is added to a sound absorption and sound insulation function by the elastic member, and thereby both the radiation sound and the solid propagation sound generated by the motor 9 can be reduced. That is, according to the soundproof member 1, not only the high frequency noise, but also the low frequency noise of 1000 Hz or lower can be reduced.

By changing a spring constant of the elastic member, or by changing the shape, the positions, the number or the like of the thick wall portions 31, the resonance frequency of the soundproof member 1 can be changed easily. In order to change the shape or the like of the thick wall portions 31, it is only necessary to mold the elastic member, and attachment of other members is not required. Thus, according to the soundproof member 1, tuning corresponding to the vibration frequency to be reduced is easy.

In the structure including the rotation body such as the motor 9 or the like, vibration of a rotation order component increases. The rotation order component is a frequency N times (N is an integer of 1 or greater) the rotation first order component. The rotation first-order component is a frequency calculated by multiplying a value obtained by converting a rotation speed of the rotation body into frequency by a basic vibration number per one rotation, and is calculated by the following formula (1), in which the basic vibration number (times) per one rotation is A, and the rotation speed (rpm) of the rotation body is B.

$$\text{rotation first-order component (Hz)}=B/60 \times A \quad (1)$$

A main component of the low frequency noise caused by the solid propagation sound or the like is considered to be the vibration with a frequency which is an even multiple of the rotation first-order component. Therefore, in order to suppress the low frequency noise caused by the solid propagation sound or the like, it is effective to suppress the vibration of the original rotation first-order component. In addition, it is found that because the vibration of the rotation order component is caused by the vibration in the rotational direction of the rotation body (torsional vibration), in order to suppress the torsional vibration, it is effective to match the resonance frequency of the soundproof member with the rotation order component.

In this point, the soundproof member 1 is designed in a manner that the resonance frequency in the circumferential direction is coincident with the rotation first-order component of the motor 9. Thus, the vibration of the motor 9 in the rotation direction (the circumferential direction) can be suppressed, and it is effective to reduce the noise caused by the solid propagation sound generated by the torsional vibration. Furthermore, in the specification, the resonance frequencies "are matched" or "are coincident" means that one resonance frequency is within a range of ±10% relative to the other resonance frequency.

Second Embodiment

Figure 3:
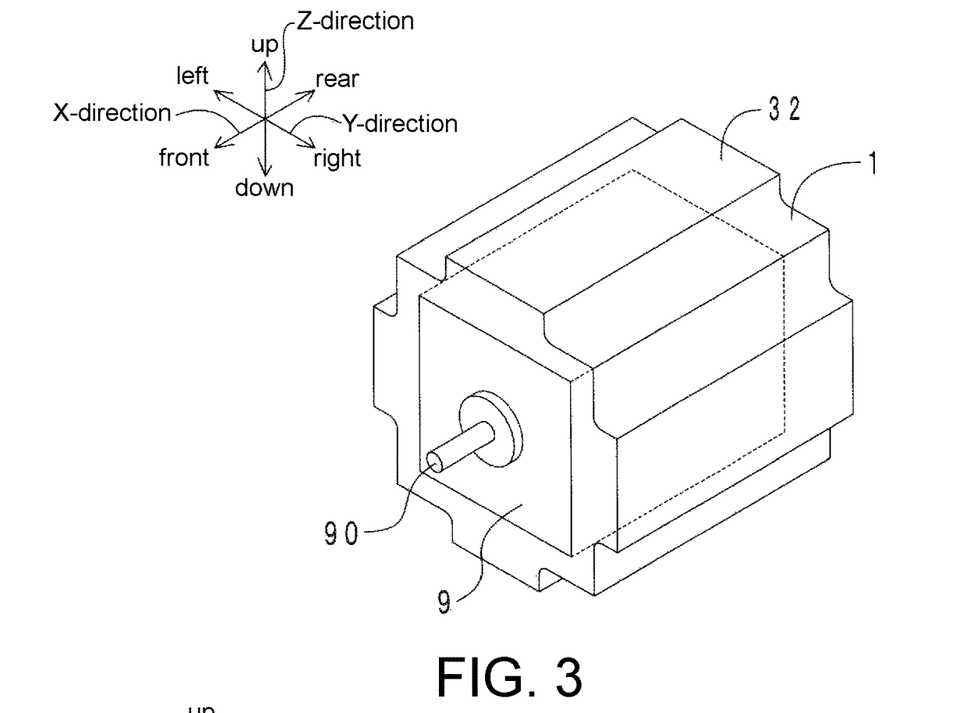
FIG. 3 is a perspective view of a soundproof member of the second embodiment in a state of being mounted on a motor.
Figure 4:
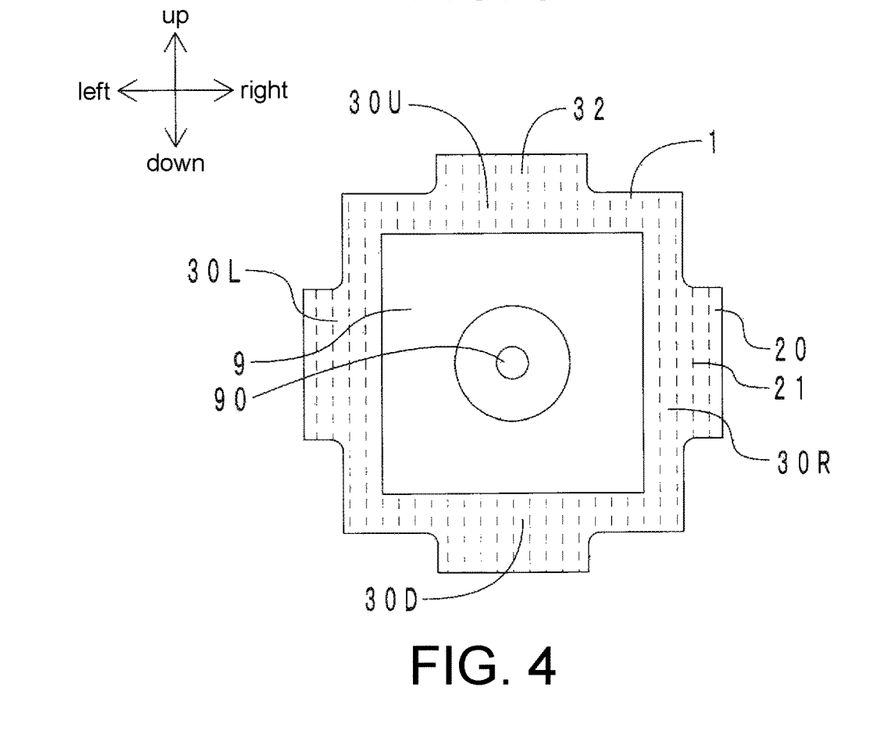
FIG. 4 is a front view of the soundproof member and schematically shows an oriented state of composite particles included in the soundproof member.

The soundproof member of the embodiment is different from the soundproof member of the first embodiment in positions of thick wall portions and the orientation direction of the composite particles. Here, the description is made focusing on the difference. FIG. 3 is a perspective view of the soundproof member of the embodiment in a state of being mounted on a motor. FIG. 4 is a front view of the soundproof member. FIG. 4 schematically shows an oriented state of the composite particles included in the soundproof member.

As shown in FIG. 3 and FIG. 4, in each of four side wall portions of the soundproof member 1, thick wall portions 32 having a thickness greater than the thickness of the other portions of the side wall portions are arranged. Each of the four thick wall portions 32 has a rectangular parallelepiped shape and extends in the X-direction. Each of the four thick wall portions 32 is arranged in the centre portion of the side wall portion. The four thick wall portions 32 are respectively arranged separately in a circumferential direction at regular intervals. A resonance frequency in the circumferential direction of the soundproof member 1 is designed to be coincident with the rotation first-order component of the motor 9.

As schematically shown in FIG. 4, the composite particles 21 are continuously oriented in a single direction (the up-down direction). That is, the composite particles 21 are oriented in a thickness direction in the upper wall portion 30U and the lower wall portion 30D and are oriented in a plane direction perpendicular to the thickness direction in the left wall portion 30L and the right wall portion 30R.

The soundproof member of the embodiment has the same operation and effect as those of the soundproof member of the first embodiment for the parts having the same configuration. In the soundproof member 1 of the embodiment, an orientation direction of the composite particles 21 is the single direction (the up-down direction). In this case, when the elastic member is foam-molded, it is sufficient to make a magnetic field act from the single direction, and thus the elastic member is easy to manufacture. In addition, due to the difference in the orientation directions of the composite particles 21, a spring constant in a Y-direction of the soundproof member 1 and a spring constant in a Z-direction of the soundproof member 1 are different. In the Z-direction the same as the orientation direction of the composite particles 21, the spring constant is greater than the spring constant in the Y-direction. Accordingly, in the Z-direction, a resonance frequency is greater than the resonance frequency in the Y-direction. On the other hand, in the Y-direction, the spring constant is smaller than the spring constant in the Z-direction. Therefore, in the Y-direction, the resonance frequency is smaller than the resonance frequency in the Z-direction. Thereby, if the orientation direction of the composite particles 21 is a single direction, the resonance frequency can be adjusted using the difference between the spring constants in the Y-direction and the Z-direction. This configuration is effective in reducing noise of a structure in which the resonance frequency in the Y-direction and the resonance frequency in the Z-direction are different.

In the soundproof member 1 of the embodiment, the thick wall portions 32 are arranged in the centre portions of the side wall portions, and thus the soundproof member 1 is suitable when it is desired to avoid interference with neighbouring peripheral components. In addition, if the thick wall portions are arranged in the centre portions of the side wall portions, compares with the case in which the thick wall portions are arranged in one side of the side wall portions (the first embodiment), a distance between a rotation centre and a centre of gravity of the thick wall portions is changed. In this way, even if the shapes or sizes of the thick wall portions are the same, the resonance frequency of the soundproof member 1 can be adjusted by changing the arrangement positions of the thick wall portions.

Third Embodiment

Figure 5:
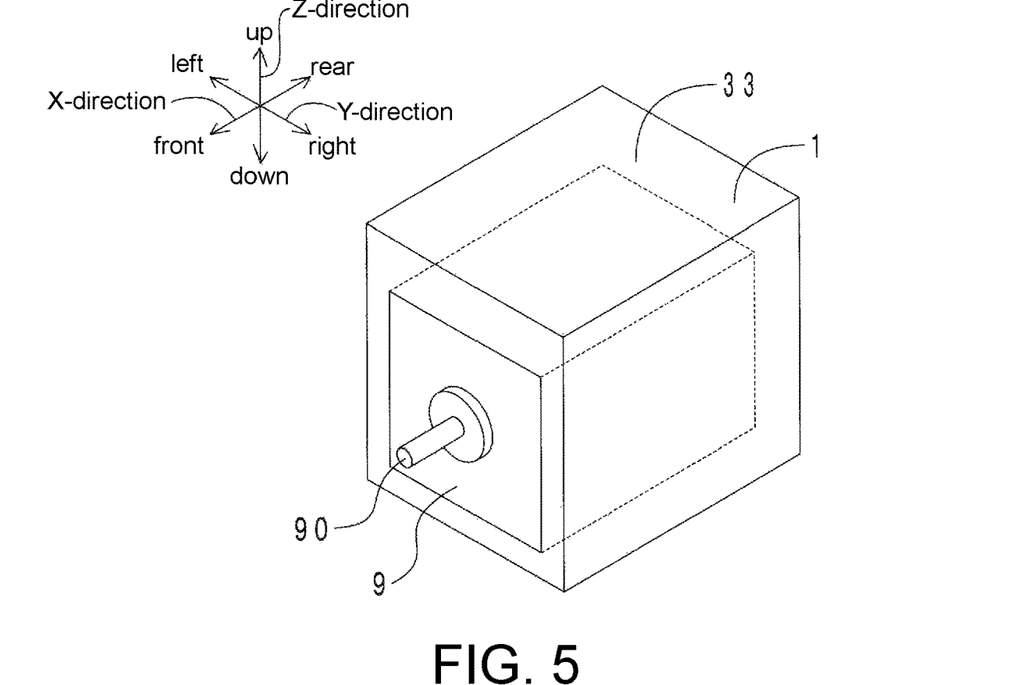
FIG. 5 is a perspective view of a soundproof member of the third embodiment in a state of being mounted on a motor.
Figure 6:
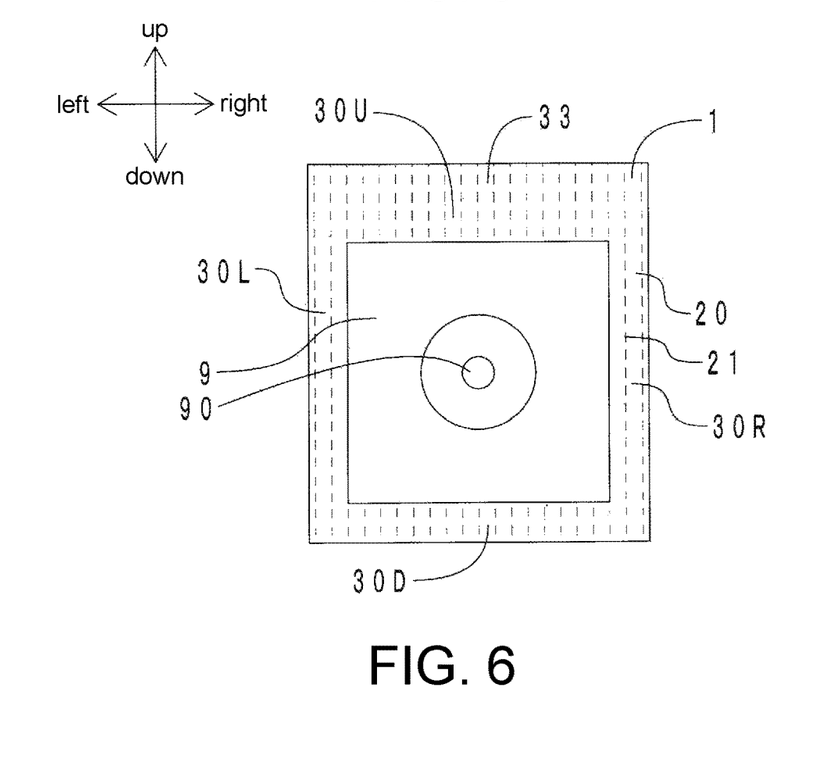
FIG. 6 is a front view of the soundproof member and schematically shows an oriented state of composite particles included in the soundproof member.

The soundproof member of the embodiment is different from the soundproof member of the first embodiment in that the thick wall portion is arranged in only one of the side wall portions and in that the composite particles are oriented in a single direction. Here, the description is made focusing on the differences. FIG. 5 is a perspective view of the soundproof member of the embodiment in a state of being mounted on a motor. FIG. 6 is a front view of the soundproof member. FIG. 6 schematically shows an oriented state of the composite particles included in the soundproof member.

As shown in FIG. 5 and FIG. 6, the thickness of the upper wall portion 30U of the soundproof member 1 is greater than thicknesses of the other three side wall portions 30R, 30D, and 30L. That is, the entire upper wall portion 30U is configured by a thick wall portion 33. The thick wall portion 33 extends in the X-direction. The thicknesses of the three side wall portions 30R, 30D, and 30L are the same. The resonance frequency in the circumferential direction of the soundproof member 1 is designed to coincident with the rotation first-order component of the motor 9.

As schematically shown in FIG. 6, the composite particles 21 are continuously oriented in the single direction (the up-down direction). That is, the composite particles 21 are oriented in the thickness direction in the upper wall portion 30U (the thick wall portion 33) and the lower wall portion 30D and are oriented in a plane direction perpendicular to the thickness direction in the left wall portion 30L and the right wall portion 30R.

The soundproof member of the embodiment has the same operation and effect as those of the soundproof member of the first embodiment for the parts having the same configuration. In the soundproof member 1 of the embodiment, the entire upper wall portion 30U covering an upper surface of the motor 9 is set as the thick wall portion 33. Compared with the first embodiment and the second embodiment in which a part is protruded outward to change the thicknesses of the side wall portions, the thick wall portion has a simple shape, and thus is easy to manufacture. In addition, similar to the second embodiment, in the soundproof member 1 of the embodiment, the orientation direction of the composite particles 21 is a single direction (the up-down direction). In this case, when the elastic member is foam-molded, it is sufficient to make a magnetic field act from the single direction, and thus the elastic member is easy to manufacture.

Fourth Embodiment

Figure 7:
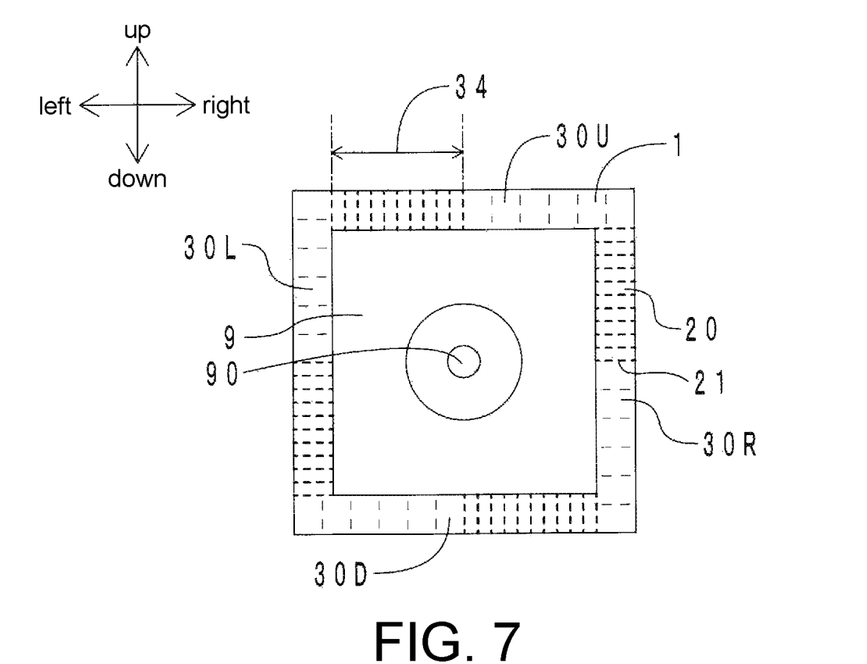
FIG. 7 is a front view of a soundproof member of the fourth embodiment in a state of being mounted on a motor and schematically shows an oriented state of composite particles included in the soundproof member.

The soundproof member of the embodiment is different from the soundproof member of the first embodiment in that highly filled portions are arrange in place of the thick wall portions. Here, the description is made focusing on the difference. FIG. 7 is a front view of the soundproof member of the embodiment in a state of being mounted on a motor. FIG. 7 corresponds to FIG. 2 described above.

As shown in FIG. 7, all of the four side wall portions, namely, the upper wall portion 30U, the lower wall portion 30D, the left wall portion 30L, and the right wall portion 30R have the base material 20 made of polyurethane foam and the composite particles 21. Thicknesses of the four side wall portions are the same. In each of the four side wall portions, highly filled portions 34 having a higher content of the composite particles 21 than the other portions of the side wall portions are arranged. Each of the highly filled portions 34 extends in the X-direction. The highly filled portions 34 are arranged on one side of the side wall portions. That is, the highly filled portion 34 of the upper wall portion 30U is arranged in a left half region of the upper wall portion 30U. The highly filled portion 34 of the right wall portion 30R is arranged in an upper half region of the right wall portion 30R. The highly filled portion 34 of the lower wall portion 30D is arranged in a right half region of the lower wall portion 30D. The highly filled portion 34 of the left wall portion 30L is arranged in a lower half region of the left wall portion 30L. The four highly filled portions 34 are arranged separately in the circumferential direction at regular intervals. The resonance frequency in the circumferential direction of the soundproof member 1 is designed to coincident with the rotation first-order component of the motor 9.

The soundproof member of the embodiment has the same operation and effect as those of the soundproof member of the first embodiment for the parts having the same configuration. In the soundproof member 1 of the embodiment, the highly filled portions 34 include more composite particles 21 than the other portions. Therefore, the mass of the highly filled portions 34 is greater than the mass of the other portions. Accordingly, the soundproof member 1 is an integral article of the elastic member and the highly filled portions 34 function as weights, and thereby an anti-vibration effect by a so-called mass-spring is played. According to the soundproof member 1 of the embodiment, the highly filled portions 34 (the eccentrically located portions) can be formed by adjusting an orientation manner of the composite particles 21 or the like without changing the shape. In addition, the highly filled portions 34 include many composite particles 21. Thereby, heat dissipation of the soundproof member 1 is further improved. In addition, by changing the spring constant of the elastic member, or by changing the content of the composite particles 21 in the highly filled portions 34 and the positions, the number or the like of the highly filled portions 34, the resonance frequency of the soundproof member 1 can be changed easily.

<Additional Description>

The embodiments of the soundproof member of the present disclosure are described above. However, the embodiments are not particularly limited to the above forms. It is also possible to implement with various modified forms and improved forms which can be performed by those skilled in the art.

In the above embodiments, the soundproof member of the present disclosure is mounted on the motor. However, the structure on which the soundproof member of the present disclosure is mounted is not limited to the above embodiments. The structure may be a drive device such as a gear case, a pump, a rotary valve, a relay, a compressor or the like, or a power transmission device.

The material, the shape, the size, the arrangement form and the like of the soundproof member are not limited to the above embodiments. The soundproof member may be a box shape, a cylindrical shape, and the like corresponding to the shape of the structure. For example, when heat dissipation is taken into consideration, a contact area with the structure should be increased. In the above embodiments, the soundproof member is formed into a box shape, and all the outer peripheral surfaces except the front surface of the structure are covered. However, the soundproof member may cover at least a part of the outer peripheral surfaces of the structure. For example, a region of about half of the structure in the circumferential direction may be covered in a C shape. In addition, the configuration, the shape, the positions, the number and the like of the eccentrically located portions are not particularly limited and may be appropriately adjusted to make the resonance frequency of the soundproof member a desired value.

The soundproof member may be formed by an elastic member not including the magnetic filler. For example, the soundproof member may be formed of a cross-linked rubber or a thermoplastic elastomer only. As described in the above embodiments, when the soundproof member is formed of the elastic member having the base material made of polymer and the magnetic filler, the base material may be a foam or a solid body. In the former case, in addition to the polyurethane foam, a foamed resin such as polyethylene foam, polypropylene foam, or the like, or a foamed elastomer can be used. In the latter case, cross-linked rubber such as urethane rubber, silicone rubber, fluoro rubber, acrylic rubber, acrylonitrile butadiene rubber or the like, and various thermoplastic elastomers of styrene system, olefin system, vinyl chloride system, polyester system, polyurethane system, and polyamide system can be used.

As the magnetic filler, for example, a ferromagnetic material such as iron, nickel, cobalt, gadolinium, stainless steel or the like, an antiferromagnetic material such as MnO, $Cr_2O_3$, $FeCl_2$, MnAs or the like, and alloys thereof may be used. In particular, from the point of view of high thermal conductivity and excellent workability as a filler, stainless steel, copper iron alloy and the like may be used. In addition, from a point of view of improving the heat dissipation, as in the above embodiment, the composite particles in which the magnetic particles are adhered to surfaces of heat conductive particles with a high thermal conductivity may be used. As a material of the heat conductive particles, for example, carbon materials such as graphite, expanded graphite, carbon fiber and the like are preferable. The orientation direction of the magnetic filler may be determined appropriately.

In the above embodiments, the resonance frequency in the circumferential direction of the soundproof member is matched with the rotation first-order component of the motor. However, the resonance frequency of the soundproof member may match with any one of the rotation order component of the structure, the resonance frequency in the Y-direction, and the resonance frequency in the Z-direction. In this case, the resonance frequency of the soundproof member may be the resonance frequency in any direction of the rotation direction, the Y-direction, and the Z-direction. For example, the resonance frequency in the Z-direction of the soundproof member may be matched with the rotation order component of the structure. In addition, the rotation order component which the resonance frequency of the soundproof member is coincident with is not limited to the first-order component. When the resonance frequency of the soundproof member is matched with the rotation order component of the structure, the resonance frequency of the soundproof member may be matched with N−n order component of the rotation N order component. Here, n is an integer of 0 or greater, and N−1≥n. n may be set to 0.

In the structure including the rotation body, the resonance frequencies may differ in the two directions (the Y-direction and the Z-direction) orthogonal to an axial direction. In this case, if the vibration in the Y-direction is suppressed, usually, the resonance frequencies of the soundproof member and the structure in the Y-direction are made to be coincident. If the vibration in the Z-direction is suppressed, the resonance frequencies of the soundproof member and the structure in the Z-direction are made to be coincident. However, it is found that in a design that the resonance frequencies in the directions shifted by 90° are coincident with each other in the soundproof member and the structure, the vibrations in both the Y-direction and the Z-direction can be reduced. According to this finding, for example, the resonance frequency of the soundproof member in the Z-direction may be matched with the resonance frequency of the soundproof member in the Y-direction. Conversely, the resonance frequency of the soundproof member in the Y-direction may be matched with the resonance frequency of the soundproof member in the Z-direction.

Implementation Example

<Manufacturing of Soundproof Member of Implementation Example>

A soundproof member having the same configuration as the first embodiment is manufactured (see FIG. 1 and FIG. 2). Hereinafter, definition of orientation is the same as in the first embodiment. First, a polyether polyol, a crosslinking agent, foaming agent water, a catalyst, and a foam stabilizer are mixed to prepare a polyol raw material. Next, the composite particles in which the graphite particles and the stainless steel particles are combined and a plasticizer are added into the prepared polyol raw material and mixed to prepare a premix polyol. Subsequently, the premix polyol and a polyisocyanate raw material are mixed to make a mixing raw material. Then, the mixing raw material is injected into a cavity of a mold and the mold is tightened, and foam-molding is performed while applying a magnetic field to the mold. If the foam-melding is finished, the mold is removed, and the soundproof member having the configuration of the above first embodiment is obtained. The obtained soundproof member is referred to as the soundproof member of the implementation example.

When a specific gravity and dynamic spring constants of the soundproof member of the implementation example are measured, the specific gravity is 0.81 g/cm$^3$, a dynamic spring constant of the composite particles in the orientation direction (the Z-direction) is 1228 N/mm, and a dynamic spring constant of the composite particles in a vertical direction with respect to the orientation direction (the Y-direction) is 308 N/mm. Here, a shape of a sample to which the dynamic spring constants are measured is a cylindrical shape with a diameter of 50 mm. Furthermore, the dynamic spring constant is a spring constant in a vibration state and is an "absolute spring constant" in JIS K 6394: 2007 or Japanese Rubber Association Standard SRIS-3503. The dynamic spring constant is a value which is obtained under a vibration frequency of 100 Hz in a manner of compressing the sample in the Y-direction or Z-direction with a compression rate of 5% in compliance with a non-resonant method specified in JIS K 6394:2007.

When the resonance frequency of the soundproof member of the implementation example is measured, the resonance frequency in the circumferential direction (the rotation direction of the rotation shaft of the motor) is 158 Hz, and the resonance frequency in the Z-direction is 386 Hz. Here, the measurement of the resonance frequency in the circumferential direction is performed using a torsion test device in compliance with JIS K 6385:2012 (item 7). In a state that the soundproof member of the implementation example is mounted on the device via a bracket and an acceleration pickup included in the device is attached to one side surface of the soundproof member, a circumferential excitation force with a torsional angle of ±0.05° and an excitation frequency of 50 to 500 Hz is applied. Then, the acceleration and the phase in the Y-direction are measured, and a frequency with a phase of −90° is set as the resonance frequency. In addition, the measurement of the resonance frequency in the Z-direction is performed using the torsion test device in compliance with JIS K 6385:2012 (item 7). In a state that the soundproof member of the implementation example is mounted on the device via a bracket and the acceleration pickup included in the device is attached to an upper side surface of the soundproof member, an excitation force of 1 G with an excitation frequency of 50 to 500 Hz is applied in the Z-direction. Then, the acceleration and the phase in the Z-direction are measured, and a frequency with a phase of −90° is set as the resonance frequency.

<Manufacturing of Soundproof Member of Comparison Example>

Figure 8:
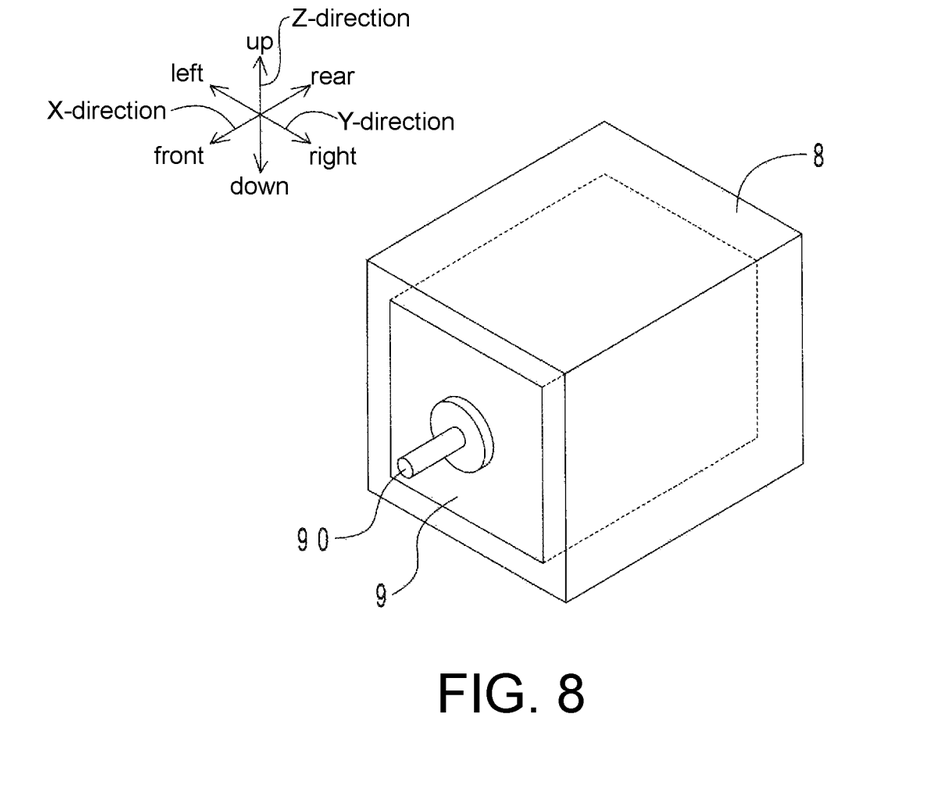
FIG. 8 is an illustration view showing an attachment state of the motor.

The same mixing raw material as the implementation example is foam-molded to manufacture a soundproof member having a box shape the same as the soundproof member of the implementation example except that the thick wall portions (the eccentrically located portions) are not included. The manufactured soundproof member is referred to as a soundproof member of a comparison example. FIG. 8 shows a perspective view of the soundproof member of the comparison example in a state of being mounted on a motor. As shown in FIG. 8, the soundproof member 8 of the comparison example has a rectangular parallelepiped box shape in which an opening is in a front surface. The soundproof member 8 covers the entire circumferential surface and a rear surface of outer peripheral surfaces of the motor 9. Thicknesses and densities of the upper, lower, left and right side wall portions of the soundproof member 8 are all the same. When a hammering test is performed on the soundproof member of the comparison example to measure resonance frequencies, the resonance frequency in the Z-direction is 342 Hz.

<Confirmation of Noise Reduction Effect>

Figure 9:
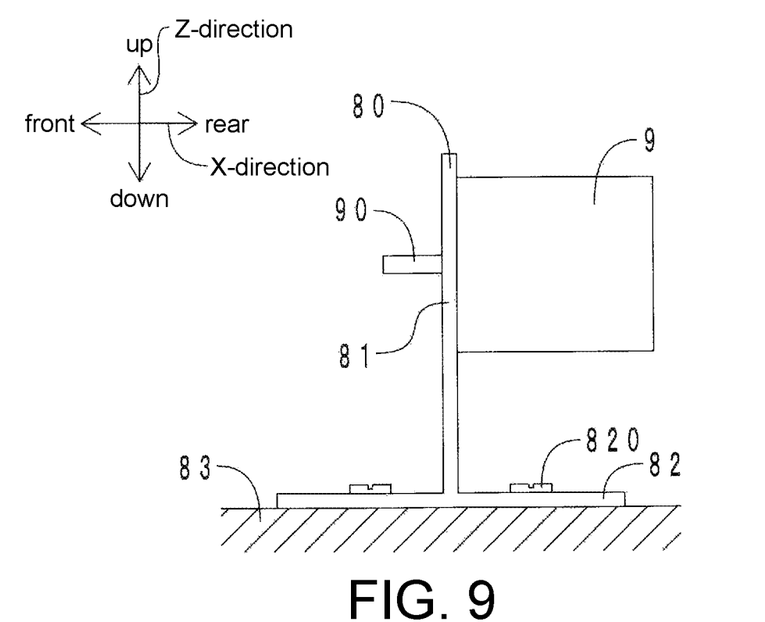
FIG. 9 is a perspective view of a soundproof member of a comparison example in a state of being mounted on a motor.

The soundproof members of the implementation example and the comparison example are respectively mounted on a motor ("17PM-K142U" made by Minebea Mitsumi Inc.), and a vibration acceleration in the Y-direction (the left-right direction) is measured. The motor is attached to the bracket in a cantilever shape. FIG. 9 shows an attachment state of the motor.

As shown in FIG. 9, a bracket 80 has an attachment portion 81 and a fixed portion 82. The attachment portion 81 has a flat plate shape and is arranged vertically in the up-down direction. Near the centre of the attachment portion 81, a circular opening is drilled. The fixed portion 82 has a flat plate shape and extends horizontally forward and backward from a lower end of the attachment portion 81. The fixed portion 82 is fixed to a bearing surface 83 by screws 820. The motor 9 is screwed to a rear surface of the attachment portion 81. The rotation shaft 90 of the motor 9 is inserted through the opening of the attachment portion 81.

When a hammering test is performed on the motor to measure resonance frequencies, the resonance frequency in the Y-direction is 320 Hz, and the resonance frequency in the Z-direction is 122 Hz. In addition, a basic vibration number per rotation of the motor is 50 times.

Measurement of the vibration acceleration is performed as below. The soundproof member is mounted on the motor 9 in the attachment state shown in FIG. 9, and a three-direction acceleration pickup of the X, Y, and Z directions is fixed to an upper portion of the attachment portion 81 of the bracket 80. A Fast Fourier Transform (FFT) analyzer is connected to the acceleration pickup. In this state, the motor 9 is rotated at two types of rotation accelerations in tests 1 and 2 described later, and the vibration acceleration in the Y-direction (the left-right direction, a direction from the back to the front of the page) is measured. An acceleration pickup included in an "FFT Analyzer PLUSE/Reflex Core" made by Bruel & Kajer (B&K) is used as the acceleration pickup.

In addition, the noise reduction effect is measured as below. In an anechoic room, the soundproof member is mounted on the motor 9 in the attachment state shown in FIG. 9, a microphone is installed at a position 750 mm away from the motor 9 in the Y-direction (the left-right direction, the direction from the back to the front of the page) and 1000 mm away from the bearing surface 83 in the Z-direction. In this state, noise levels (dB) when the motor 9 is rotated at the two types of rotation accelerations in the tests 1 and 2 described later are measured. Then, a difference between the noise level when the soundproof member is mounted and the noise level for a single motor is taken as the noise reduction effect. A microphone included in an "FFT Analyzer PLUSE/Reflex Core" made by Bruel & Kajer (B&K) is used as the microphone.

Two types of measurement tests of the vibration acceleration are performed by changing the rotational speed of the motor. In either of the tests, the resonance frequency of the soundproof member of the implementation example is adjusted to match with the rotation first-order component of the motor.

[Test 1] Rotation Speed of the Motor of 190 Rpm

When the basic vibration number per rotation of the motor of 50 times (A) and the rotation speed of the motor of 190 rpm (B) are substituted in the above formula (I), the rotation first-order component of the motor is 158 Hz. In test 1, the resonance frequency (158 Hz) of the soundproof member of the implementation example in the circumferential direction matches with the rotation first-order component of the motor. Furthermore, a resonance frequency (386 Hz) in the Z-direction of the soundproof member of the implementation example is close to the resonance frequency (320 Hz) in the Y-direction of the motor and the rotation second-order component (316 Hz) of the motor.

[Test 2] Rotation Speed of the Motor of 460 Rpm

When the basic vibration number per rotation of the motor of 50 times (A) and the rotation speed of the motor of 460 rpm (B) are substituted in the above formula (I), the rotation first-order component of the motor is 383 Hz. In test 2, the resonance frequency (386 Hz) of the soundproof member of the implementation example in the Z-direction matches with the rotation first-order component of the motor.

Figure 10:
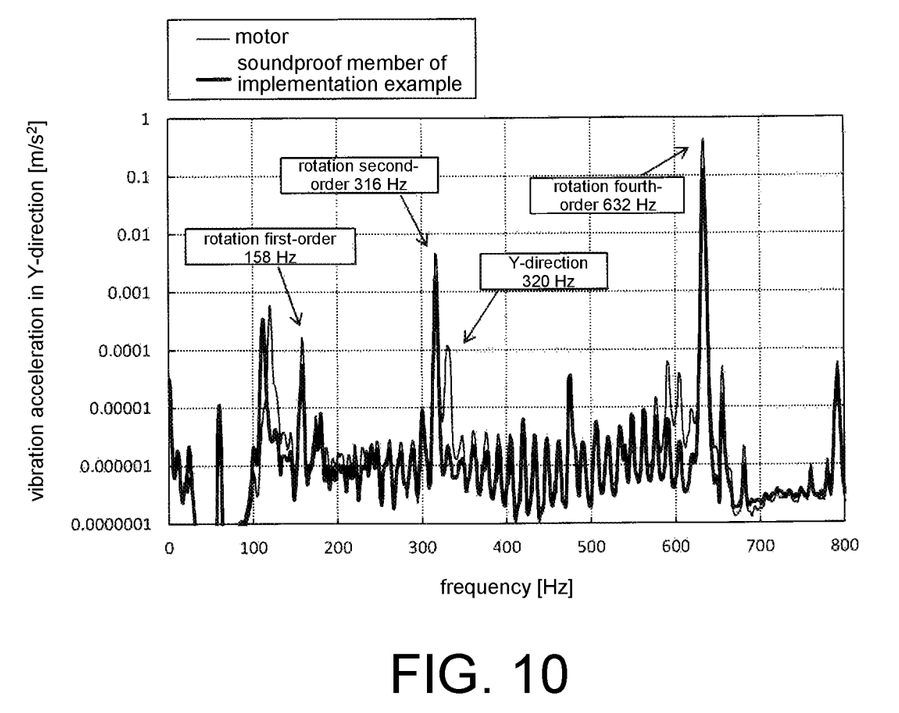
FIG. 10 is a graph showing a measurement result of a vibration acceleration of the soundproof member of the implementation example in test 1.
Figure 11:
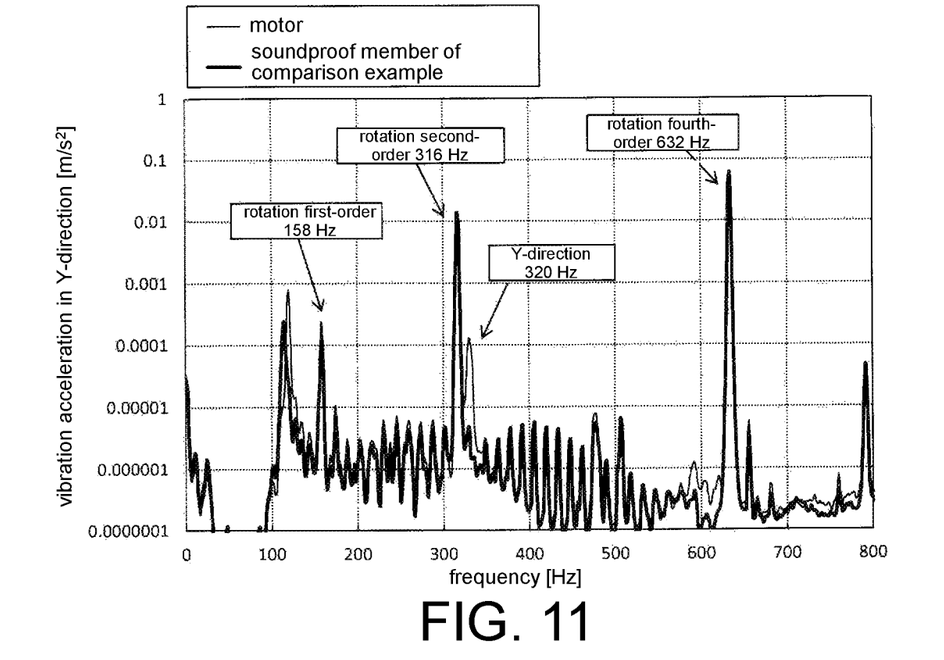
FIG. 11 is a graph showing a measurement result of a vibration acceleration of the soundproof member of the comparison example in test 1.
Figure 12:
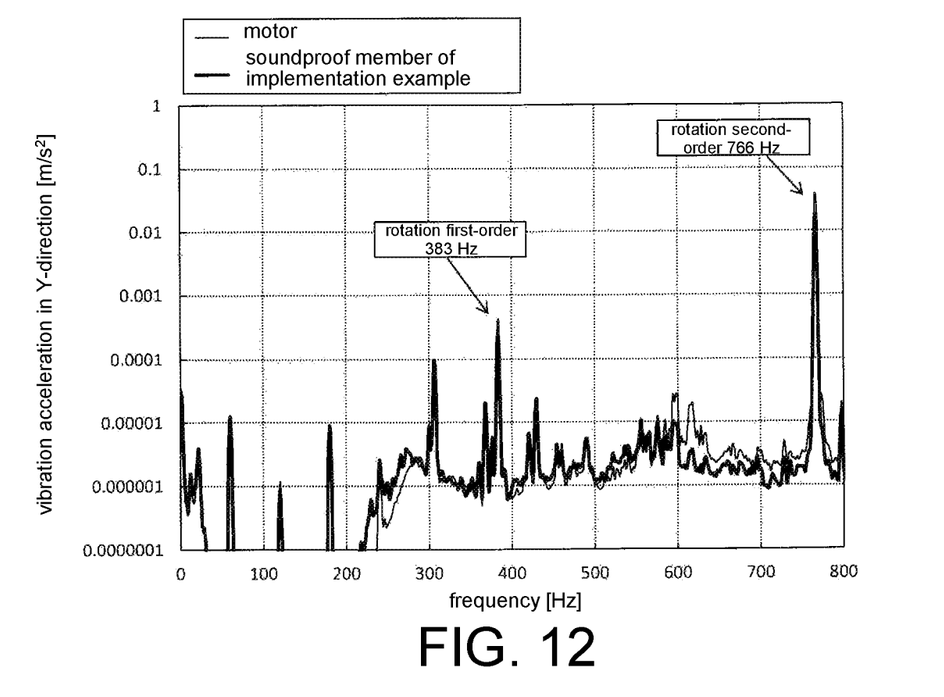
FIG. 12 is a graph showing a measurement result of the vibration acceleration of the soundproof member of the implementation example in test 2.
Figure 13:
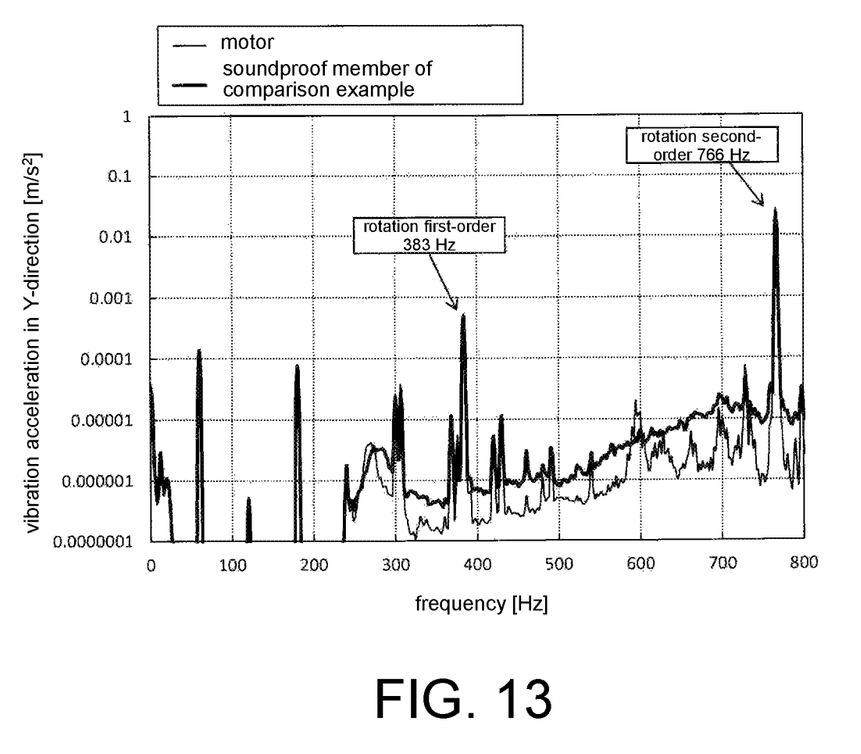
FIG. 13 is a graph showing a measurement result of the vibration acceleration of the soundproof member of the comparison example in test 2.
Figure 14:
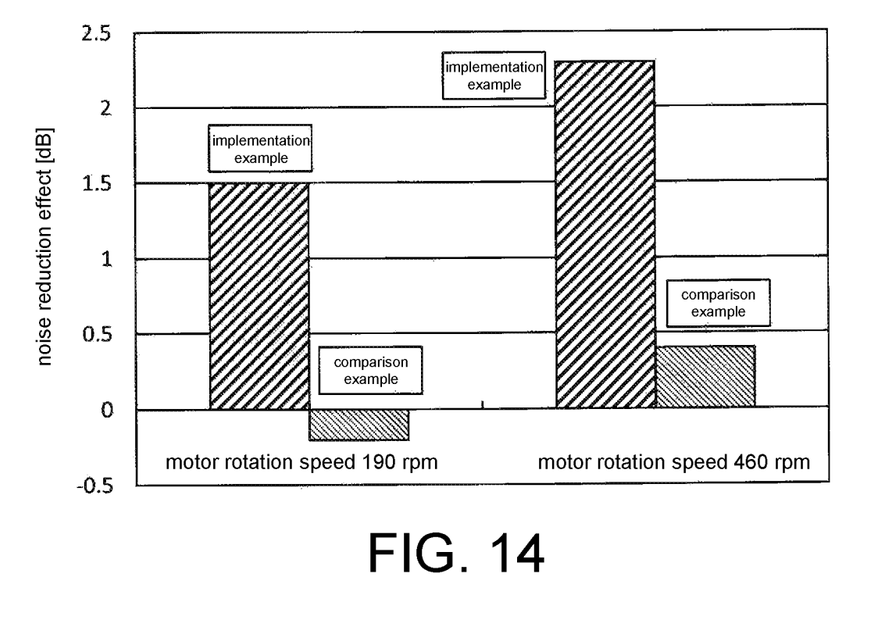
FIG. 14 is a graph showing noise reduction effects of the soundproof members of the implementation example and the comparison example.

FIG. 10 shows a measurement result of the vibration acceleration of the soundproof member of the implementation example in test 1. FIG. 11 shows a measurement result of the vibration acceleration of the soundproof member of the comparison example in test 1. FIG. 12 shows a measurement result of the vibration acceleration of the soundproof member of the implementation example in test 2. FIG. 13 shows a measurement result of the vibration acceleration of the soundproof member of the comparison example in test 2. FIG. 14 shows the noise reduction effect by a bar graph. In the graphs of FIGS. 10-13, for comparison, measurement results of the vibration acceleration of the single motor on which the soundproof member is not mounted are indicated by thin lines.

First, the result of Test 1 is described. As shown in FIG. 10, when the soundproof member of the implementation example is mounted, peaks of the rotation first-order component (158 Hz), a rotation second-order component (316 Hz), and a rotation fourth-order component (632 Hz) are reduced. In addition, a peak near 320 Hz equivalent to the resonance frequency of the motor in the Y-direction is also greatly reduced. In contrast, as shown in FIG. 11, when the soundproof member of the comparison example is mounted, although peaks near the rotation first-order component (158 Hz) and 320 Hz are reduced, peaks of the rotation second-order component (316 Hz) and the rotation fourth-order component (632 Hz) are increased. When a comparison is made by the bar graph in FIG. 14, the noise reduction effect of the soundproof member of the comparison example is −0.2 dB, whereas the noise reduction effect of the soundproof member of the implementation example is increased to 1.5 dB.

Next, the result of Test 2 is described. As shown in FIG. 12, when the soundproof member of the implementation example is mounted, peaks of the rotation first-order component (383 Hz) and the rotation second-order component (766 Hz) are reduced. In contrast, as shown in FIG. 13, when the soundproof member of the comparison example is mounted, although the peak of the rotation second-order component (766 Hz) is reduced, the peak of the rotation first-order component (383 Hz) is increased. When a comparison is made by the bar graph in FIG. 14, the noise reduction effect of the soundproof member of the comparison example is 0.4 dB, whereas the noise reduction effect of the soundproof member of the implementation example is increased to 2.3 dB. According to the above, it is confirmed that if the soundproof member of the present disclosure is used, the low-frequency noise of 1000 Hz or lower can be effectively reduced.

What is claimed is:

1. A soundproof member, which is mounted on a structure having a rotation body, covers at least a part of outer peripheral surfaces of the structure, and includes an integral article of an elastic member, the soundproof member comprising:
   side wall portions, each of which corresponds to the outer peripheral surfaces of the structure;
   eccentrically located portions, respectively provided on each of the side wall portions,
   each of the eccentrically located portions has a greater thickness or a greater density in one portion of the side wall portion than the other portion of the side wall portion,
   wherein the eccentrically located portions are arranged respectively to be separated in a rotation direction of the rotation body.

2. The soundproof member according to claim 1, wherein the eccentrically located portions are thick wall portions having a greater thickness than the other portions.

3. The soundproof member according to claim 2, wherein the thick wall portions extend along an axial direction of the rotation body.

4. The soundproof member according to claim 2, wherein there are a plurality of the thick wall portions which are arranged respectively to be separated in the rotation direction of the rotation body.

5. The soundproof member according to claim 1, wherein the elastic member comprises a base material including polymer and a magnetic filler contained in a state of being oriented in the base material.

6. The soundproof member according to claim 5, wherein the eccentrically located portions are highly filled portions in which a content of the magnetic filler is greater than that of the other portions.

7. The soundproof member according to claim 6, wherein the highly filled portions extend along an axial direction of the rotation body.

8. The soundproof member according to claim 6, wherein there are a plurality of the highly filled portions which are arranged respectively to be separated in a rotation direction of the rotation body.

9. The soundproof member according to claim 1, wherein surfaces in the outer peripheral surfaces of the structure and arranged in a rotation direction of the rotation body are covered.

10. The soundproof member according to claim 1, wherein when a horizontal direction is defined as a Y-direction and a vertical direction is defined as a Z-direction in two directions orthogonal to an axial direction of the rotation body,
   a resonance frequency of the soundproof member matches with any one of a rotation order component, a resonance frequency in the Y-direction, and a resonance frequency in the Z-direction of the structure.

11. The soundproof member according to claim 10, wherein a resonance frequency of the soundproof member in a rotation direction of the rotation body matches with the rotation order component of the structure.

12. The soundproof member according to claim 10, wherein the resonance frequency in the Y-direction of the structure and the resonance frequency in the Z-direction of the structure are different, and
   a resonance frequency in the Z-direction of the soundproof member matches with the resonance frequency in the Y-direction of the structure.

13. The soundproof member according to claim 10, wherein a resonance frequency in the Z-direction of the soundproof member matches with the rotation order component of the structure.

* * * * *